United States Patent
Yoshida

[11] Patent Number: 6,013,960
[45] Date of Patent: Jan. 11, 2000

[54] MOTOR UNIT WITH ROTATION DETECTING MECHANISM

[75] Inventor: Yasushi Yoshida, Kiryu, Japan

[73] Assignee: Mitsuba Corporation, Kiryu, Japan

[21] Appl. No.: 09/004,383

[22] Filed: Jan. 8, 1998

[30] Foreign Application Priority Data

Jan. 9, 1997 [JP] Japan .................................. 9-013456

[51] Int. Cl.[7] .................................................. H02K 11/00
[52] U.S. Cl. ........................................... 310/68 B; 310/51
[58] Field of Search ................................. 310/51, 68 B, 310/89, 261

[56] References Cited

U.S. PATENT DOCUMENTS

| | | | |
|---|---|---|---|
| 2,828,616 | 4/1958 | Zeigler et al. | 310/51 |
| 4,617,484 | 10/1986 | Buijsen | 310/51 |
| 5,306,123 | 4/1994 | Day et al. | 310/51 |
| 5,704,111 | 1/1998 | Johnson et al. | 310/51 |

FOREIGN PATENT DOCUMENTS

7-27272 U  5/1995  Japan .

*Primary Examiner*—Clayton LaBalle
*Attorney, Agent, or Firm*—Oliff & Berridge, PLC

[57] ABSTRACT

A motor unit capable of preventing a sensor magnet made to rotate in synchronization with its output shaft from being supported in an inclined condition with respect to a case cover. The sensor magnet and the output shaft are coupled to each other through a first holder fitted to the output shaft so as to rotate integrally with the output shaft, a second holder fitted to the sensor magnet so as to rotate integrally with the sensor magnet and rotatably supported by the case cover, and an elastic member placed between the first holder and the second holder and including axially extending engaging leg portions and radially recessed engaging catch portions respectively engaging with the first holder and the second holder without looseness in the circumferential direction.

7 Claims, 8 Drawing Sheets

MOTOR UNIT WITH ROTATION DETECTING MECHANISM

BACKGROUND OF THE INVENTION

1. Field of Invention

The present invention relates to a motor unit applicable to electrical equipment for motor vehicles or the like.

2. Description of Related Art

Figure 8:
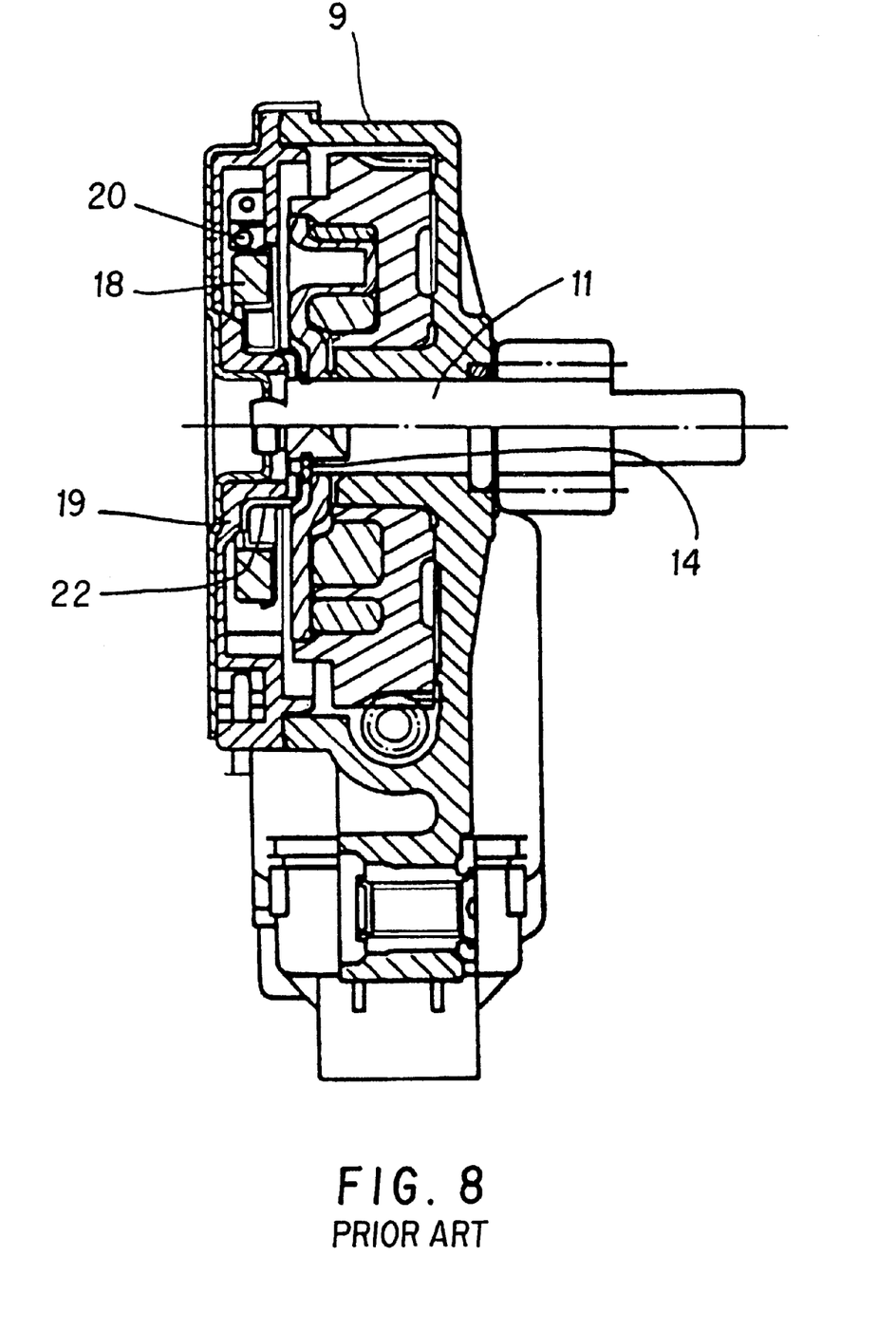
FIG. 8 is a cross-sectional elevation view showing a conventional prior motor unit.

In general, motor units of this kind include a motor equipped with a rotation detecting mechanism for detecting the quantity of rotation (number of revolutions) of an output shaft of a motor to detect the quantity of movement or the position of a movable member operating in accordance with the drive of the motor, one known prior example of which is shown in FIG. 8.

The motor unit exemplified in FIG. 8 is designed to detect the rotation of a motor output shaft 11 through the use of a sensor magnet 18 whose N and S poles are alternately polarized along its circumference and a reed switch 20 that switches between ON and OFF in response to the variation of the magnetic field caused by the rotation of the sensor magnet 18. In this motor unit, a magnet holder 22 fixedly supporting the sensor magnet 18 is fitted over the output shaft 11 in a locked condition to be rotatable integrally with the output shaft 11. The magnet holder is further rotatably supported on a case cover 19 attached to the opening side of a gear case 9 that rotatably supports the output shaft 11. The reed switch 20 is installed on the case cover 19 and separated by a predetermined distance from the sensor magnet 18, and the contact of the reed switch 20 switches between ON and OFF in accordance with the variation of the magnetic field due to the rotation of the sensor magnet 18 so that this switching signal is converted into a pulse signal to be counted, thereby allowing the detection of the quantity of rotation (number of revolutions) of the output shaft 11.

In the foregoing conventional motor unit, the magnet holder fixedly supports the sensor magnet and is fitted over the output shaft in a locked condition as mentioned above, and further is pivotally supported on a bearing section of the case cover. Accordingly, because of manufacturing and assembling errors, for instance, if the magnet holder is installed in the case cover bearing section in an inclined condition, a large load can be generated at a rotational sliding portion between the case cover bearing section and the magnet holder, which can cause deformation of the sliding portion or premature wear of the sliding portion.

In addition, if the magnet holder is in the inclined condition as mentioned above, the distance between the sensor magnet and the reed switch varies in accordance with the rotational position of the sensor magnet, thus resulting in production of unstable pulses.

In the foregoing related art, the magnet holder 22 is positioned in an axial direction between a lock ring 14 fixedly attached to the output shaft and the case cover 19. The magnet holder can be shifted in position in its axial direction or become loose due to the dimensional errors between the respective parts, or the like. In such an instance, the relative position between the sensor magnet and the reed switch can be shifted, which also makes it difficult to obtain stable pulses.

As disclosed in Japanese Unexamined Utility Model Publication No. 7-27272, a drive member (corresponding to the aforesaid magnet holder) connected to an output shaft and a sensor magnet are interrelated with a given separation therebetween so that the separation can absorb the above-mentioned inclination. However, this construction can create problems in that the sensor magnet can become loose in circumferential directions by an amount corresponding to the separation with respect to the output shaft and the reed switch. Furthermore, the positional shifting in the circumferential directions occurs between the output shaft and the sensor magnet, which causes errors in rotation detection. This and other problems are solved by the Applicant's invention.

In the structure disclosed in the aforementioned publication, the regulation of the position of the magnetic holder in its axial directions is made through the use of a special fixing ring and wavy washer. However, in this case, there is a problem that the number of parts and the number of assembling steps increase.

SUMMARY OF THE INVENTION

Accordingly, the present invention has been developed in order to eliminate the above-discussed problems.

According to an embodiment of the present invention, a motor unit is equipped with a rotation detecting mechanism installed on a case cover that is connected to the open end of a case. The case rotatably supports an output shaft of a motor. The rotation detecting mechanism includes a sensor magnet made to rotate integrally with the output shaft and a reed switch for detecting the rotation of the sensor magnet, wherein the sensor magnet and the output shaft are coupled to each other through a first holder fitted to the output shaft in a locked condition, a second holder fitted to the sensor magnet in a locked condition and rotatably supported by the case cover, and an elastic material placed between both the holders and equipped with engaging sections engaging with both holders in locked conditions.

With this arrangement, even if the sensor magnet rotatably supported on the case cover is inclined with respect to the output shaft rotatably supported by the case, due to processing errors, assembling errors etc., the errors in the inclination of the sensor magnet, etc. can be absorbed through an elastic deformation of the elastic material positioned between the first and second holders. Consequently, unlike the prior art, the present invention avoids generation of a large load on the rotational sliding portion, and variations in the distance between the sensor magnet and the reed switch resulting from the magnet holder coming into an inclined condition with respect to the case cover bearing section, with the result that stable pulses are attainable. In addition, unlike the structure in which the magnet holder and the sensor magnet are engaged with each other in a state where a separation is defined therebetween, it is possible to eliminate various troubles, that is, to prevent the sensor magnet from becoming loose or to prevent positional shifting from occurring in the circumferential directions between the output shaft and the sensor magnet.

Moreover, in this arrangement, compressive sections are provided on the elastic material, with the compressive sections being located between the first holder and the second holder to be compressed and to thereby exert a load pressing the second holder toward the case cover side as a result of the compression load. Therefore, the second holder to which the sensor magnet is attached is positioned with no looseness and is rotatably supported by the case cover, with the result that more stable pulses are attainable. In this case, the elastic material is used in place of a special positioning member, and therefore, it is possible to use parts in common, which contributes to a lower manufacturing cost.

BRIEF DESCRIPTION OF THE DRAWINGS

The object and features of the present invention will become more readily apparent from the following detailed description of the preferred embodiments taken in conjunction with the accompanying drawings in which.

DETAILED DESCRIPTION OF PREFERRED EMBODIMENTS

An embodiment of the present invention will be described hereinbelow with reference to the drawings. In the illustrations, numeral 1 represents a motor unit equipped with a reduction mechanism and a rotation detecting mechanism, and as in the basic structure of the prior art, a motor section 2 of the motor unit 1 is made such that a motor shaft 4 is rotatably supported within a closed bottom cylindrical motor case 3 and such that devices such as an armature core, a commutator, an electricity supply brush and a permanent magnet (these are not shown in the illustrations) are housed within the motor case 3.

Figure 1:
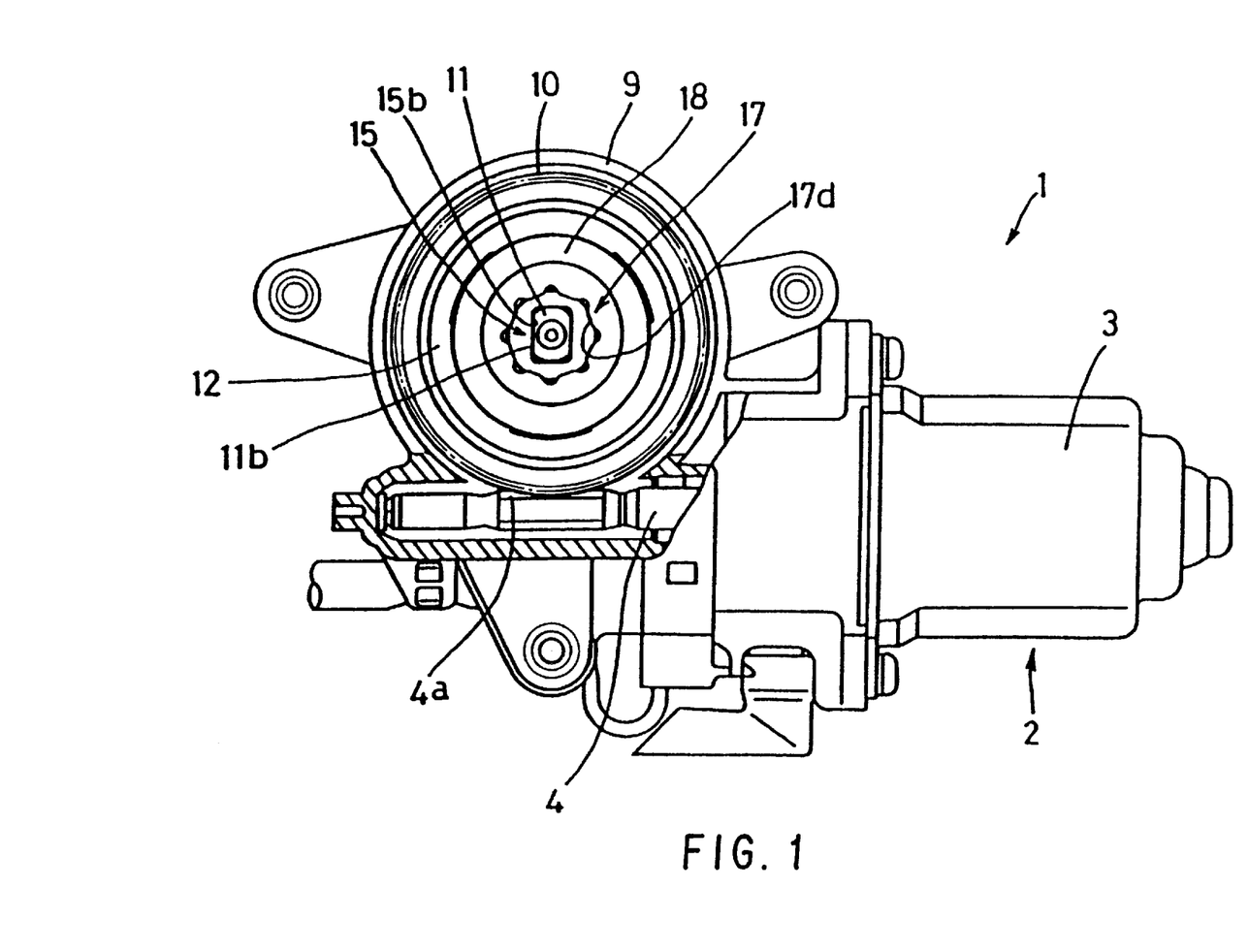
FIG. 1 is a plan view partially in cross section showing a motor unit according to an embodiment of the present invention.
Figure 2:
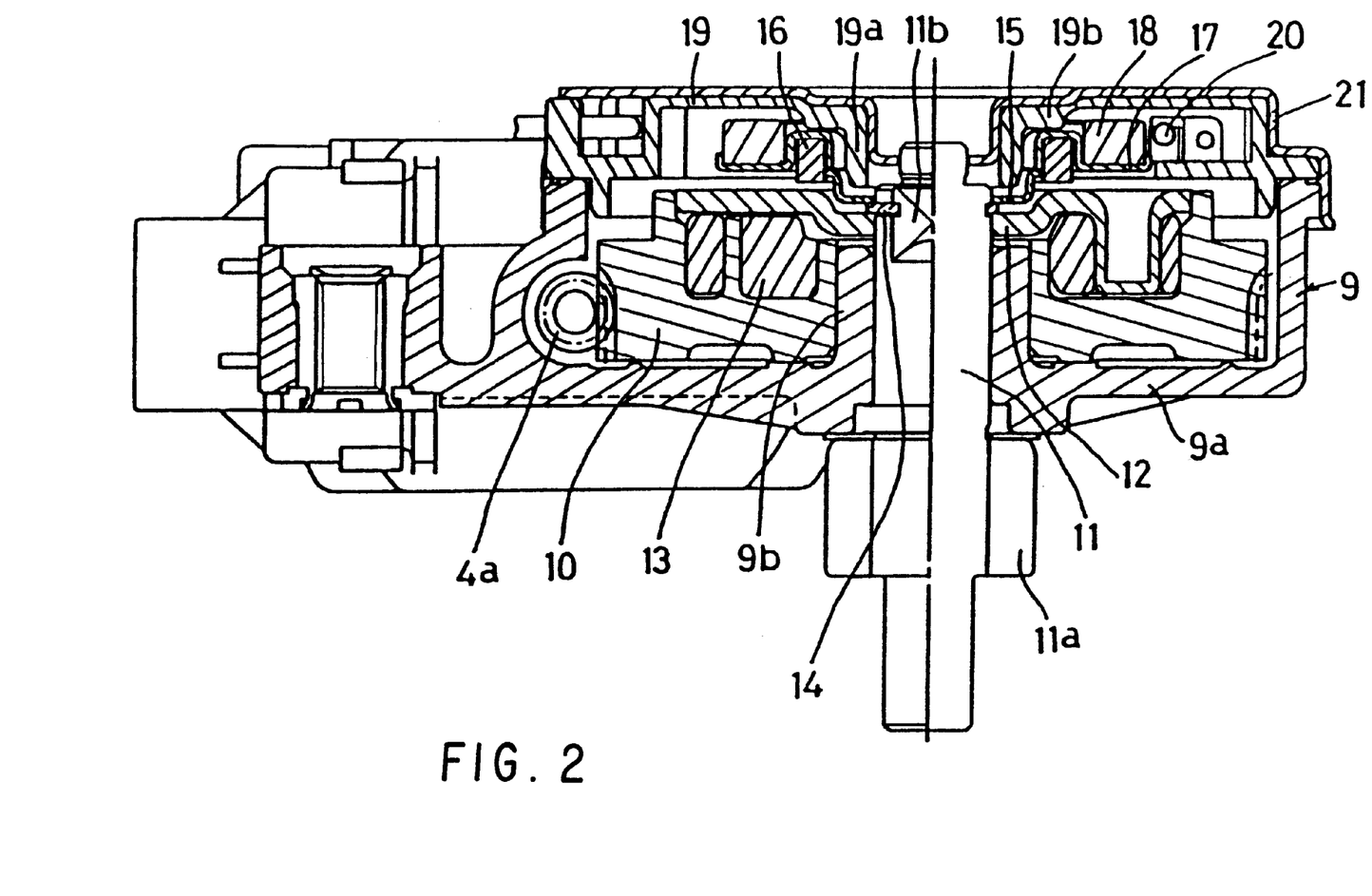
FIG. 2 is a cross-sectional side elevation view showing the motor unit according to this embodiment.

The tip portion of the motor shaft 4 protrudes within a gear case 9 positioned against an opening side end of the motor case 3, and is equipped with a worm gear 4a. Further, the gear case 9 has a generally box-like cross section with an opening axial end as shown in FIG. 2, a case cover 19 fitted over the opening axial end, and a worm wheel 10 engaged with the worm gear 4a being rotatably supported on an outer circumferential surface portion of a cylindrical boss cylinder section 9b formed to protrude from a substantially central portion of a bottom surface portion 9a of the gear case 9.

Furthermore, an output shaft 11 is rotatably supported on an inner circumferential surface portion of the boss cylinder section 9b of the gear case 9, while a lower portion of the output shaft 11 protrudes downwardly from the gear case bottom surface portion 9a, and a pinion gear 11a linked with a movable member (not shown) is formed integrally with the protruding lower portion of output shaft 11. A chamfered section 11b is formed at an upper section of the output shaft 11, while a lock plate 12 is fitted over the chamfered section 11b so as to rotate integrally with the output shaft 11. In addition, the lock plate 12 is engaged through a damper 13 with the worm wheel 10 to be rotatable together with the worm wheel 10, so that the output shaft 11 integrally rotates with damping in accordance with the rotational movement of the worm wheel 10. In FIG. 2, numeral 14 designates a lock ring fixedly fitted to the upper side of a fitting portion of the lock plate 12 on the output shaft chamfered section 11b, with lock ring 14 inhibiting the upward movement of the lock plate 12 in its axial direction.

Figure 3A:
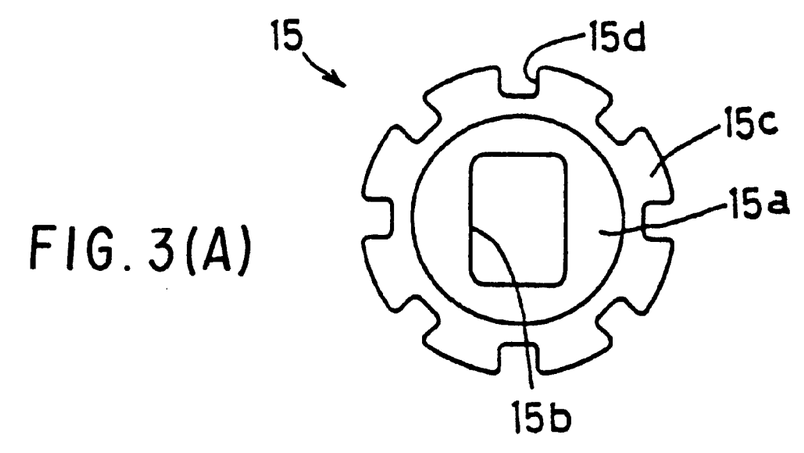
FIGS. 3A and 3B are respectively a bottom view and a semi-cross-sectional ide elevation view showing a first holder of the motor unit according to this embodiment.
Figure 3B:
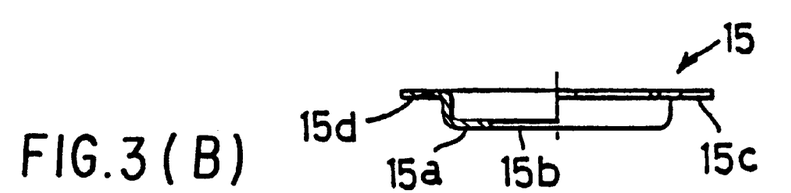

Numeral 15 denotes a first holder attached to the upper side of a locking portion of the lock ring 14 of the output shaft chamfered section 11b to be rotatable integrally with the output shaft 11. First holder 15 has a cylindrically recessed bottom surface section 15a, the central portion of which has a fit hole 15b engaging with the output shaft chamfered section 11b in such a state that the first holder 15 is prevented from rotating relative to the output shaft 11, thereby enabling the first holder 15 to rotate integrally with the output shaft 11. In addition, a plurality of circumferentially spaced engaging recess portions 15d for engaging with engaging leg portions 16b (which will be described herein later) of an elastic member 16 are notched in an annular flange section 15c formed on a portion of first holder 15 that extends axially upward and radially outward from the bottom surface section 15a.

Figure 5A:
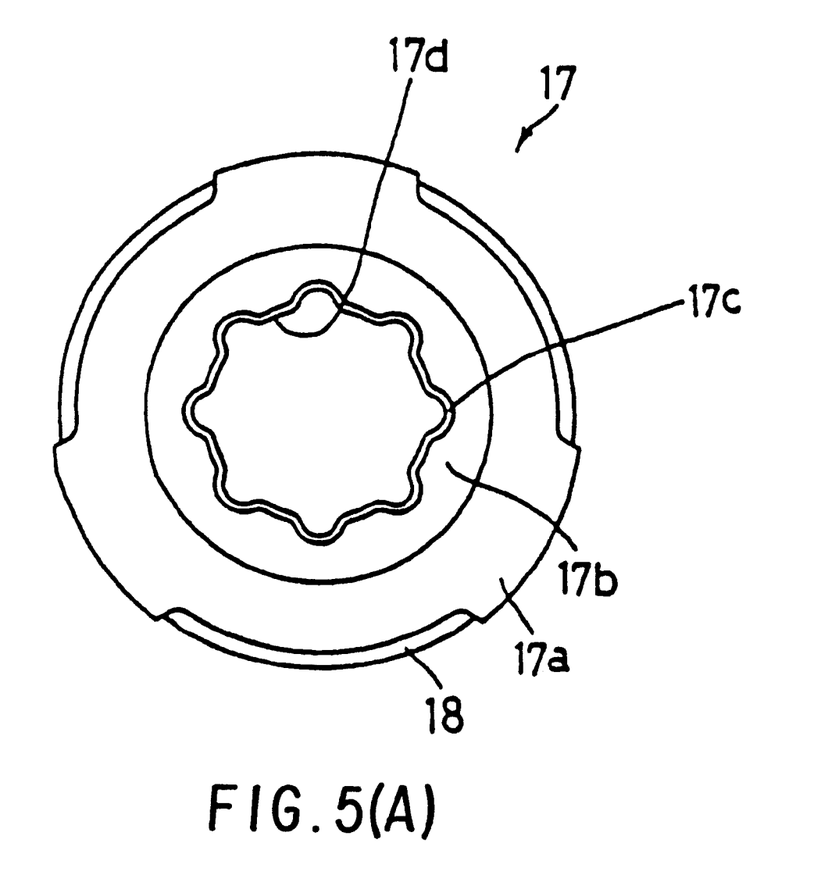
FIGS. 5A and 5B are respectively a bottom view and a semi-cross-sectional side elevation view showing a second holder of the motor unit according to this embodiment.
Figure 5B:
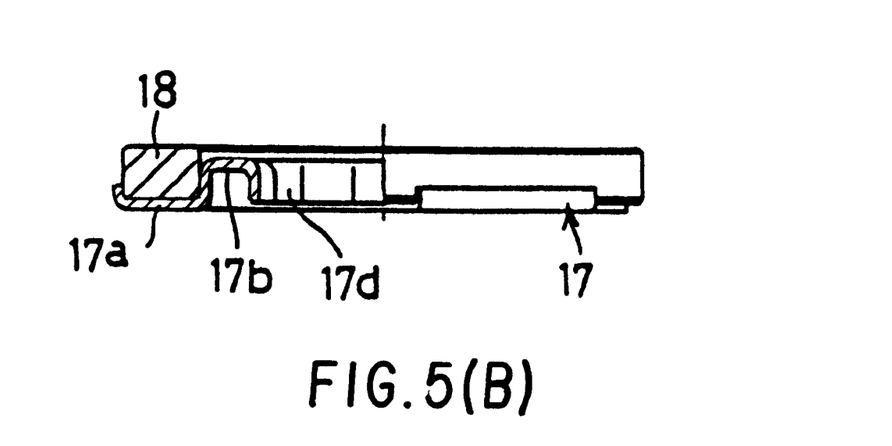

Numeral 17 designates a second annular holder, with a sensor magnet 18 (which will be described herein later) being fixedly secured onto a magnet fitting section 17a formed on the outer circumference of second holder 17. An annular groove section 17b for engaging with the elastic member 16 is formed at an inner circumferential surface of the magnet fitting section 17a Engaging projection portions 17c, which are equal in number to the circumferentially spaced engaging recess portions 15d of the first holder 15, and which engage with radially recessed engaging catch portions 16d (which will be described herein later) of the elastic member 16 are formed on an inner circumferential section of the groove section 17b at predetermined intervals in a circumferential direction. A hole 17d through second holder 17, which is fitted rotatably over a bearing section 19a protruding from case cover 19, is formed on the inner circumferential side of the groove section 17b.

Figure 4A:
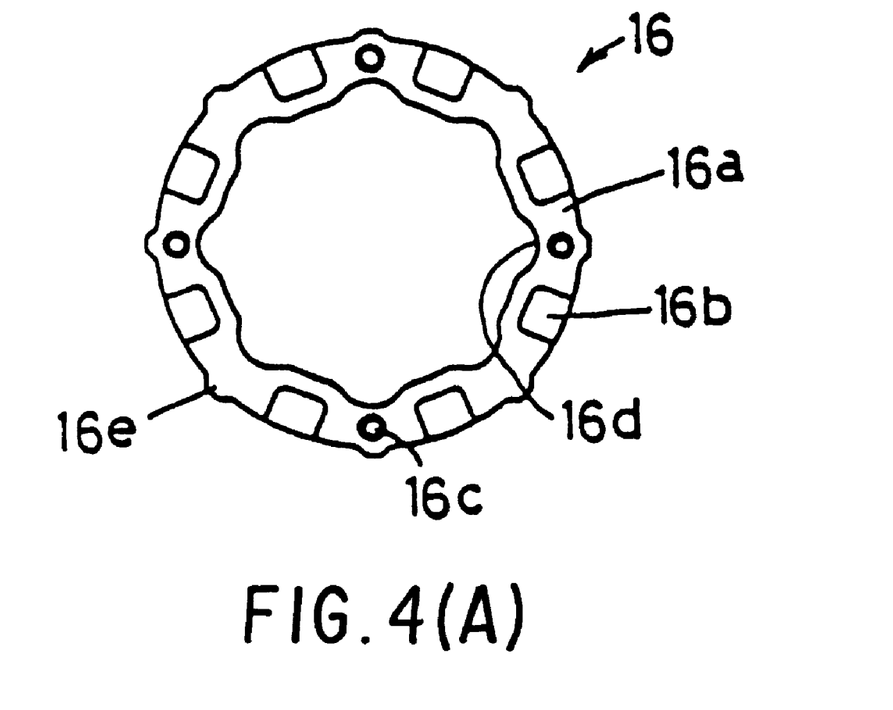
FIGS. 4A and 4B are respectively a bottom view and a semi-cross-sectional side elevation view showing an elastic member of the motor unit according to this embodiment.
Figure 4B:
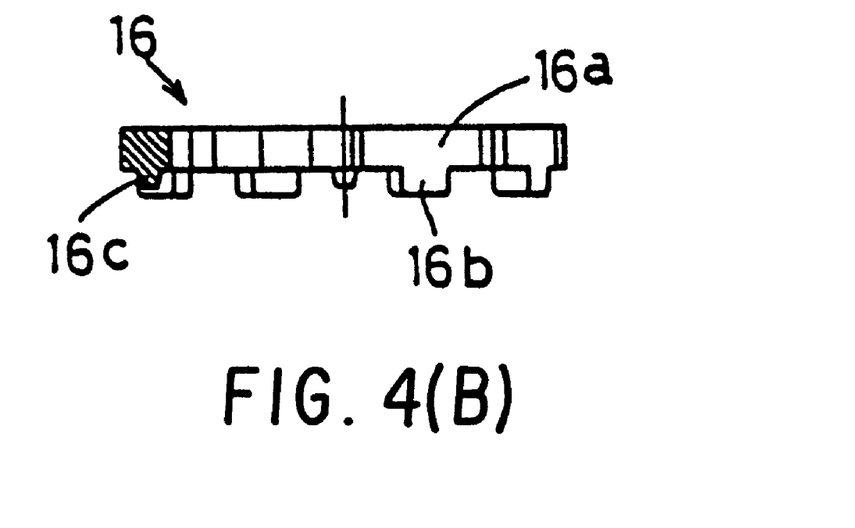

The elastic member 16 is formed from an elastomeric material with elastic properties and is set with respect to the first and second holders 15, 17 so that an annular upper section 16a of elastic member 16 is fitted in the second holder groove section 17b with engaging catch portions 16d positioned in opposed relation to engaging projection portions 17c of groove section 17b on second holder 17 and so that a lower section of elastic member 16 faces an upper section of the first holder annular flange section 15c. Circumferentially spaced engaging leg portions 16b of the lower section of elastic member 16 extend axially downward from upper section 16a and respectively engage snugly with the engaging recess portions 15d of the first holder annular flange section 15c of the first holder to prevent free play in a circumferential direction between elastic member 16 and first holder 15. Additionally, a plurality of axially extending compressive portions 16c are formed alternately between the circumferentially spaced engaging leg portions 16b and extending downwardly from upper section 16a by an amount less than the engaging leg portions 16b. Compressive portions 16c come into contact with an upper surface section of the first holder annular flange section 15c. Circumferentially spaced engaging catch portions 16d respectively engage snugly with the engaging projection portions 17c of the second holder 17 without looseness or free play in the circumferential direction and are formed on an inner circumferential surface of the upper section 16a of elastic member 16 alternately with the engaging leg portions 16b.

The first and second holders 15, 17 are assembled and set relative to each other through the elastic member 16. When the first holder 15 is rotationally driven integrally with the rotation of the output shaft 11, the elastic member 16 is driven to rotate by the first holder 15 and the second holder 17 is driven to rotate by the elastic member 16, so that the first and second holders 15, 17 integrally rotate in a state with the elastic member 16 interposed therebetween.

If the elastic member 16 is designed such that it comes into surface contact over too large an area with the first and second holders 15, 17, there is a possibility that the elastic member 16 would become integrated with the first and second holders 15, 16 and lose its necessary elasticity. For this reason, in this embodiment, a plurality of radially extending projections 16e are formed on an outer circumferential surface section of the upper section 16a facing a side surface of the second holder groove section 17b, and the tip portions of the projections 16e are brought into contact with the second holder 17. This can prevent the elastic member 16 and the second holder 17 from coming into surface contact over too large of an area with each other. Because the elastic member 16 in this embodiment is designed such that the compressive portions 16c come into contact with the first holder 15 as described above, they also prevent surface contact over too large of an area between the elastic member 16 and the first holder 15.

The sensor magnet 18 has an annular configuration in which N and S poles are alternately polarized along its circumference. Sensor magnet 18 is fixedly secured to the magnet fitting section 17a of the second holder 17 as described above.

Figure 6:
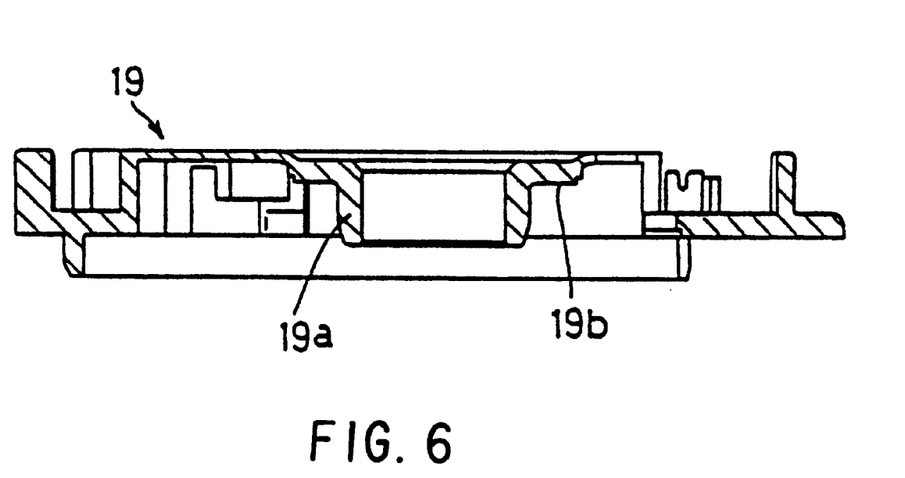
FIG. 6 is a cross-sectional view showing a case cover of the motor unit according to this embodiment.
Figure 7:
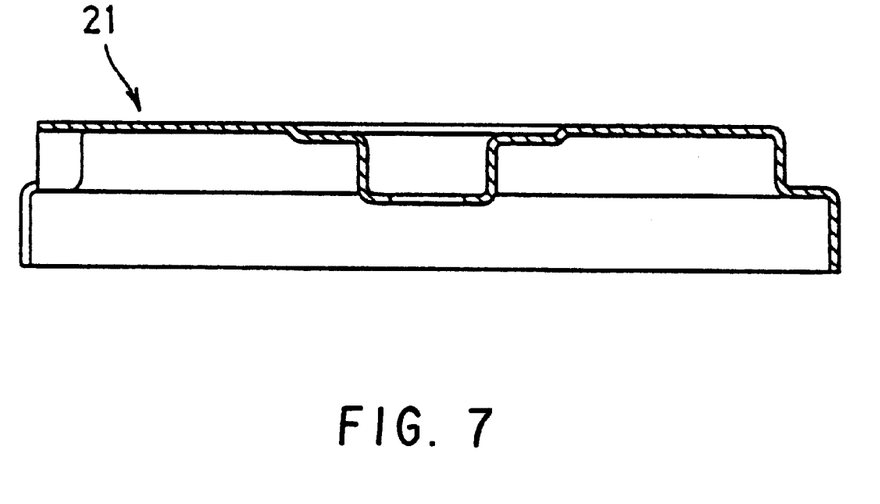
FIG. 7 is a cross-sectional view showing an external cover of the motor unit according to this embodiment.

The case cover 19 is joined to the upper opening side of the gear case 9 with the annular bearing section 19a protruding axially downward and substantially aligned with the boss cylinder section 9b of the gear case 9. Bearing section 19a fits within the hole 17d through the second holder 17, and allows holder 17 to rotate relative to case cover 19. The reed switch 20 is attached to the case cover 19 at a portion separated from the sensor magnet 18 that is fixedly secured to the second holder 17. Reed switch 20 turns ON and OFF in accordance with the variation of the magnetic field resulting from the rotation of the sensor magnet 18, with the switching signal being converted into a pulse signal in a control section (not shown) and counted, thereby detecting the quantity of rotation or number of revolutions of the sensor magnet 18. Numeral 21 in FIG. 2 designates an external cover attached integrally to the external side of the case cover 19.

The first and second holders 15, 17 and the elastic member 16, engaged and set in the above described manner, are incorporated into the motor unit 1 such that the first holder hole 15b is fitted over the output shaft chamfered section 11b on the upper axial side of lock ring 14, and the case cover 19 is positioned over the opening axial end of the gear case 9 while the case cover bearing section 19a is fitted in the second holder hole 17d. The dimensions of the components are selected such that when assembled, the first holder bottom surface section 15a contacts the upper surface of lock ring 14 to limit downward movement of the first holder, and the upper surface section of the second holder groove section 17b contacts a flange section 19b formed on the outer circumferential side of the case cover bearing section 19a to restrict upward movement of the second holder. The compressive portions 16c of the elastic member 16 are compressed in the upward axial direction by the first holder annular flange section 15c, and cause the second holder 17 to be always pressed toward the case cover 19 side as a result of the compression load.

In the construction described above, the rotation of the motor shaft 4 is transmitted through the worm gear 4a, the worm wheel 10, the damper 13 and the lock plate 12 to the output shaft 11 in a reduced condition to move the movable members. The rotation of the sensor magnet 18 rotating in synchronization with the output shaft 11 is detected by the reed switch 20, thus detecting the position of the movable members. The output shaft 11 and the sensor magnet 18 are coupled to each other through the first holder 15 fitted to the output shaft 11 so as to rotate integrally with the output shaft 11, the second holder 17 fixedly secured to the sensor magnet 18, and the elastic member 16 having the engaging leg portions 16b engaging with the first holder 15 and the engaging catch portions 16d engaging with the second holder 17 without looseness or free play in the circumferential direction.

As a result, even if the sensor magnet 18 rotatably supported on the case cover 19 side is inclined with respect to the output shaft 11 that is rotatably supported on the gear case 9, due to manufacturing and assembly errors, the inclination errors, etc. can be absorbed through an elastic deformation of the elastic member 16 positioned between the first and second holders 15, 17. Consequently, unlike the prior art, even if the magnet holder comes into an inclined condition with respect to the case cover bearing section, a large load will not be exerted on the rotational sliding portion therebetween, and the distance between the sensor magnet 18 and the reed switch 20 will be maintained at a substantially constant level, with the result that stable pulses are attainable. In addition, unlike the structure in which the magnet holder and the sensor magnet are interrelated in a state where a separation is defined therebetween, it is possible to eliminate various problems by preventing the sensor magnet from becoming loose or preventing positional shifting from occurring in the circumferential directions between the output shaft and the sensor magnet.

Moreover, in this arrangement, the second holder 17 supporting the sensor magnet 18, as discussed above, is pressed toward the case cover 19 side by the compression load resulting from compressive portions 16c of the elastic member 16. Therefore, the upper surface section of the groove section 17b is always placed in contact with the case cover flange 19b. Consequently, it is possible to prevent the sensor magnet 18 from shifting in the axial directions and becoming loose, which enables more stable pulses. The positioning of the second holder 17 in the axial direction is accomplished through the use of the elastic member 16 for absorbing the above described errors without requiring a special positioning member, so that it is possible to use parts in common, which contributes to a lower manufacturing cost.

It should be understood that the foregoing relates to one preferred embodiment of the present invention, and that it is intended to cover all changes and modifications of the embodiment of the invention described herein, which do not constitute departures from the spirit and scope of the invention as defined in the following claims.

What is claimed is:

1. A motor, comprising:

a case having a closed axial end and an opening axial end, said case rotatably supporting an output shaft;

a case cover fitted over said opening axial end of said case;

a rotation detecting mechanism, said rotation detecting mechanism including a sensor magnet rotating integrally with said output shaft and a reed switch for detecting the rotation of the sensor magnet;

a first holder fitted over said output shaft to rotate integrally with said output shaft;

a second holder rotatably supported by said case cover and fitted with said sensor magnet to rotate integrally with said sensor magnet; and an elastic member fitted snugly between said first holder and said second holder in a circumferential direction, said elastic member engaging with said first holder so as to rotate integrally with said first holder by being driven in a circumferential direction by said first holder which rotates integrally with said output shaft, and further said elastic member which has rotated integrally with said first holder engaging with said second holder so as to rotate integrally with said second holder by being driven in a circumferential direction by said first holder.

2. The motor according to claim 1, wherein said elastic member includes compressive portions positioned between said first holder and said second holder with said compressive portions exerting an axial load on said second holder in a direction toward said case cover.

3. The motor according to claim 1, wherein said engaging sections include circumferentially spaced, axially extending portions of said elastic member, and circumferentially spaced, radially recessed portions of said elastic member.

4. The motor according to claim 3, wherein said axially extending portions engage with circumferentially spaced notches in said first holder, and said radially recessed portions of said elastic member engage with circumferentially spaced projection portions of said second holder.

5. The motor according to claim 4, wherein said elastic member includes compressive portions positioned between said first holder and said second holder with said compressive portions exerting an axial load on said second holder in a direction toward said case cover.

6. The motor according to claim 5, wherein said compressive portions are circumferentially spaced and disposed between said axially extending portions of said elastic member.

7. A motor, comprising:

a case having a closed axial end and an opening axial end, said case rotatably supporting an output shaft;

a case cover fitted over said opening axial end of said case;

a rotation detecting mechanism, said rotation detecting mechanism including a sensor magnet rotating integrally with said output shaft and a reed switch for detecting the rotation of the sensor magnet;

a first holder fitted over said output shaft to rotate integrally with said output shaft;

a second holder rotatably supported by said case cover and fitted with said sensor magnet to rotate integrally with said sensor magnet, said second holder axially spaced along said output shaft from said first holder; and an elastic member fitted snugly between said first holder and said second holder with engaging sections of said elastic member engaging with said first holder and said second holder such that there is no looseness between said first holder, said elastic member and said second holder in a circumferential direction.

* * * * *